July 29, 1969         G. R. RUGG        3,458,337
METHOD FOR MAKING COVERING MATERIALS INCORPORATING
FOAMED RESIN MATERIAL AND PRODUCT THEREOF
Filed June 6, 1966        3 Sheets-Sheet 1
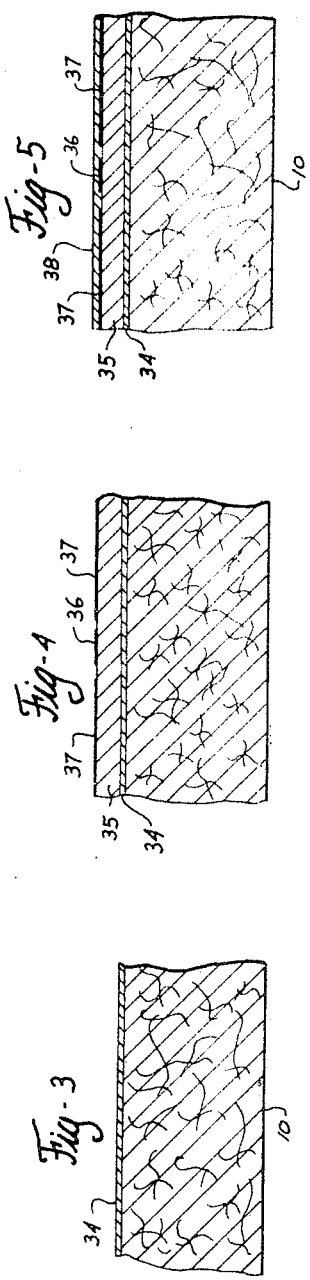
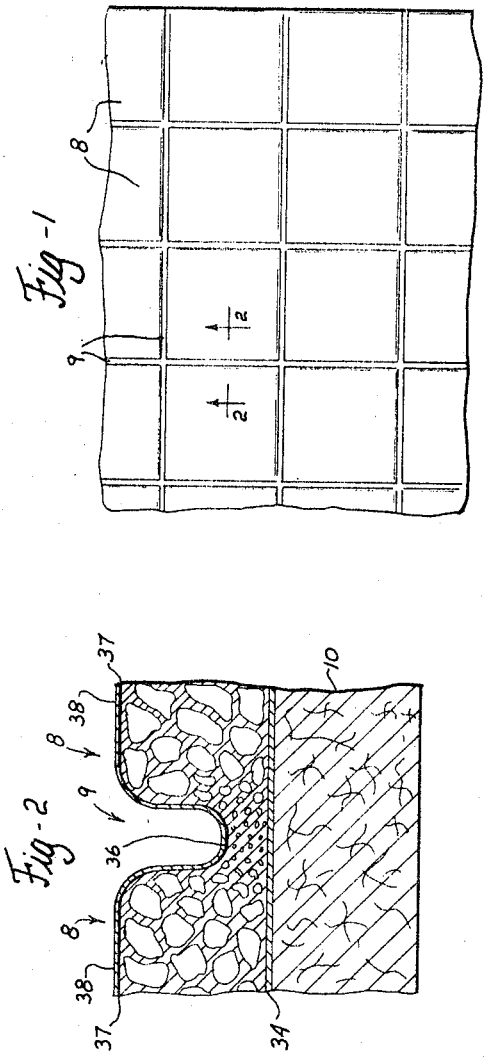
INVENTOR.
Gordon R. Rugg
BY
ATTORNEYS

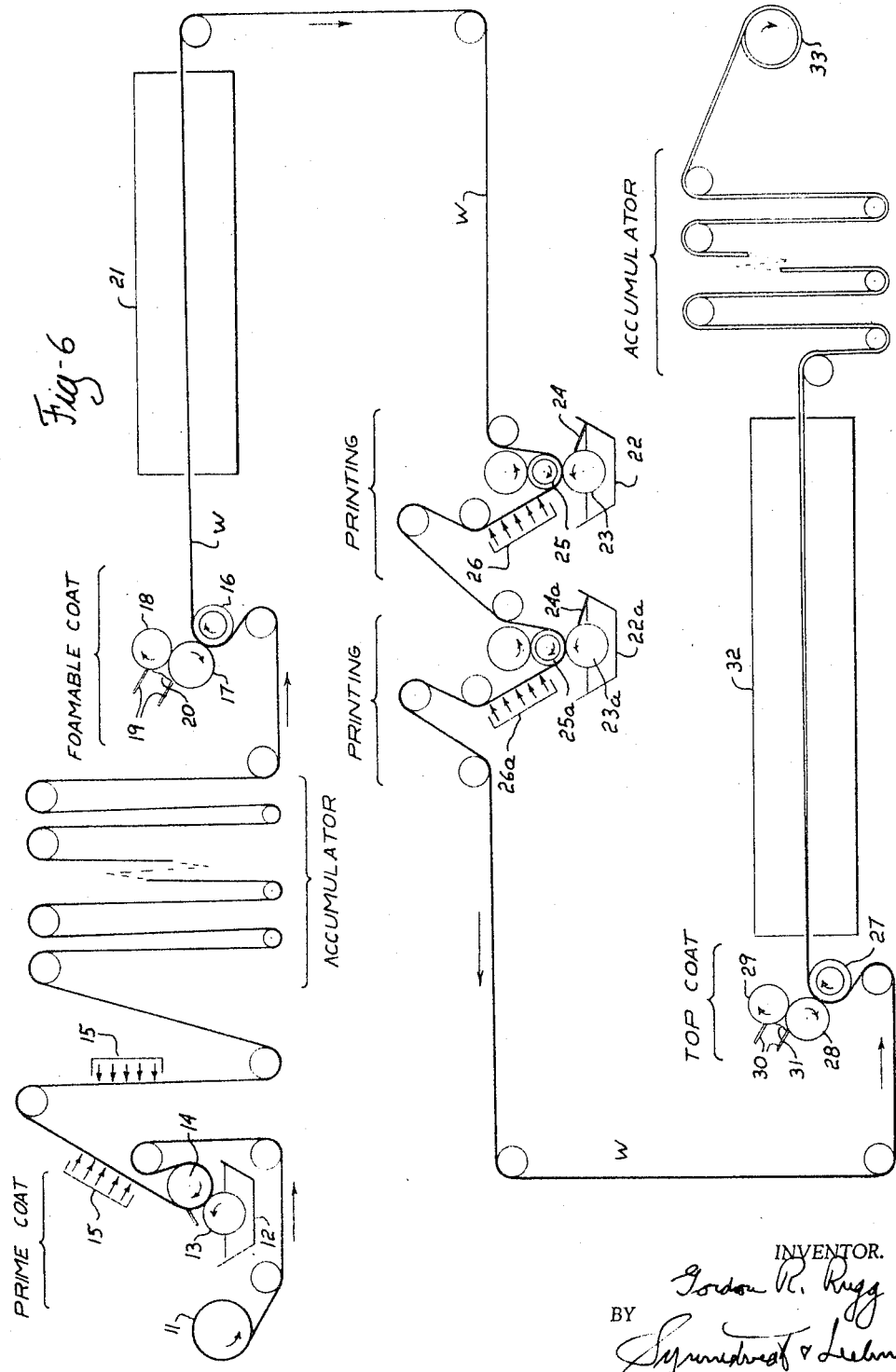

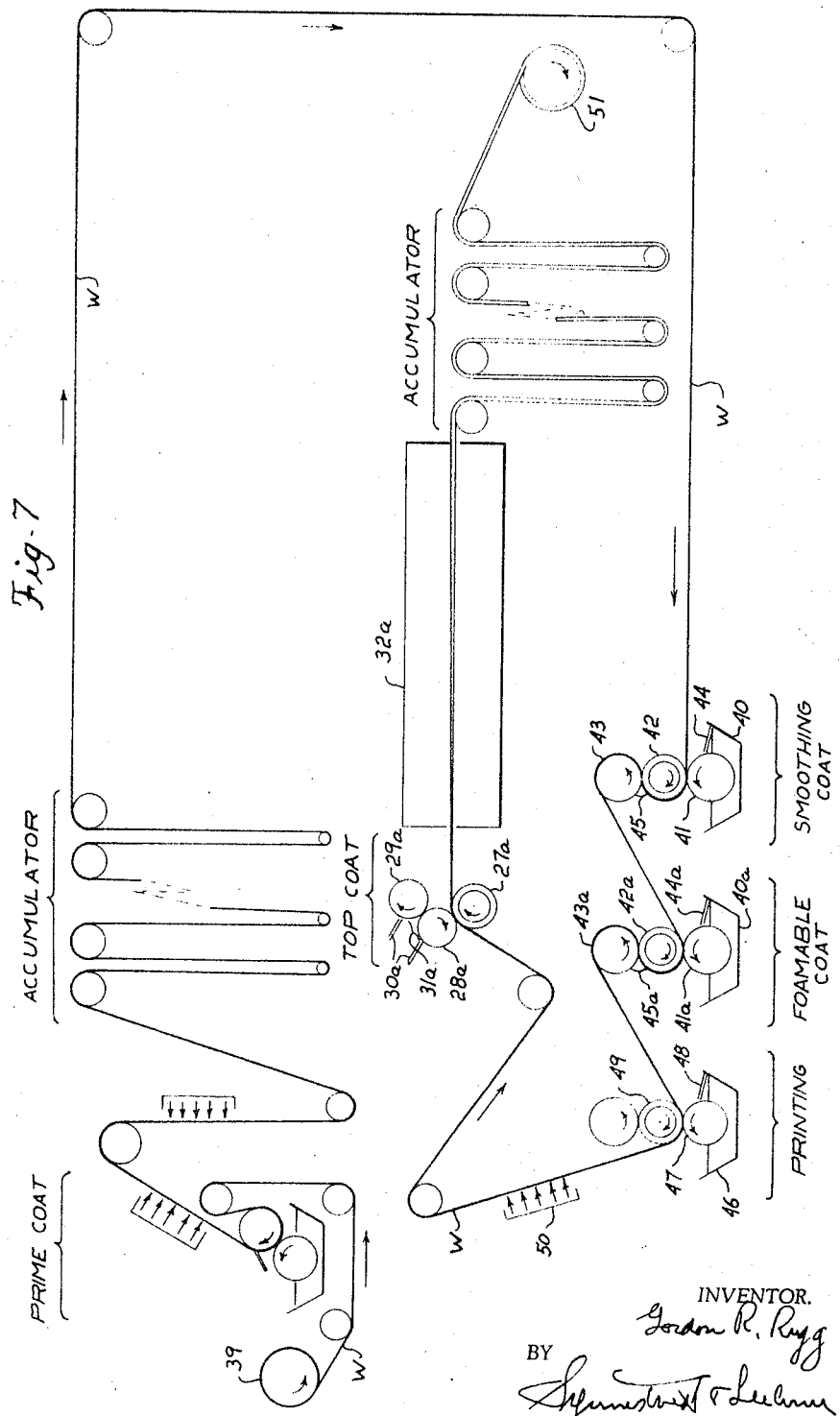

United States Patent Office
3,458,337
Patented July 29, 1969

3,458,337
METHOD FOR MAKING COVERING MATERIALS INCORPORATING FOAMED RESIN MATERIAL AND PRODUCT THEREOF
Gordon R. Rugg, Allentown, Pa., assignor to GAF Corporation, a corporation of Delaware
Continuation-in-part of application Ser. No. 473,751, July 21, 1965. This application June 6, 1966, Ser. No. 555,489
Int. Cl. B41m 1/24; B44d 1/14
U.S. Cl. 117—15                        4 Claims

ABSTRACT OF THE DISCLOSURE

A method for producing a textured surface covering material such as a floor covering, comprising applying to a substrate a polyvinyl resin composition containing a foaming agent and also containing an organo-zinc catalyst for lowering the decomposition temperature of the foaming agent, heating the foamable composition to a temperature sufficient to gel the resin material but insufficient to decompose the foaming agent, applying in selected pattern areas an agent for suppressing the catalytic action of the catalyst in the foamable composition, and applying heat to fuse the resin material and to decompose the foaming agent in areas intervening between said pattern areas; and the resulting product.

---

This application is a continuation-in-part of my application Ser. No. 473,751, filed July 21, 1965 and now abandoned.

This invention relates to the production of covering materials incorporating foamed resin material, especially foamed or porous polyvinyl chloride resin materials. The invention is particularly useful in the production of floor coverings in which the foamed resin materials provide resilience or cushioning in the floor covering.

Although various methods for making covering materials and floor coverings of the general type referred to are already known, it is one of the principal objects of the invention to provide a novel and improved technique or method for producing such covering materials.

In addition to the foregoing, the product itself as produced by the method according to the present invention not only has a desirable degree of porosity and resilience, but also has improved characteristics. For example, the product is characterized by exceptional freedom from tendencies to discolor, particularly upon aging, and also has exceptional resistance to sulphide staining.

In considering certain other objects and advantages of the present invention, it is first pointed out that in a typical process for making a floor covering according to the invention, a coating of foamable resin material is applied to a flexible base sheet, the coating comprising polyvinyl chloride resin material and also incorporating what is known as a foaming or blowing agent dispersed therein. The foaming agent is adapted upon subsequent heating, such as employed to fuse the resin, to decompose and liberate gaseous decomposition products and this results in development of the porosity or foamed condition of the material which is desired. The type of technique to which the invention is directed is further one in which a composition is applied in certain design or pattern areas upon the foamable material, prior to the heating to develop the porosity thereof, and in which the applied composition incorporates an agent which results in diminution of the tendency of the foamable material to develop porosity upon heating in those areas in which the composition is applied. In consequence of this, the product comprises interspersed lands and valleys, generally simulating an embossed effect, and the lands are relatively porous and the valleys relatively solid.

For the foregoing purpose, the invention contemplates a unique interrelation or interaction between certain ingredients of the foamable composition applied and certain ingredients of the composition applied in pattern areas on the layer of the foamable composition. The unique system referred to makes use of ingredients which do not tend to darken the product or discolor, even upon aging of the floor covering or subjection thereof to various adverse influences in use, and in consequence it is possible by employment of the unique system of the invention to produce products having a broad range of pattern effects including pattern effects incorporating light or pastel shades of colors, and even white. Moreover, it is practical according to the invention to produce such varying product patterns in intricate or simple designs, as desired.

The unique system of ingredients and reactions provided according to the present invention is also advantageous in several respects from the process standpoint, for instance in providing for accomplishment of satisfactory expansion or foaming without resort to excessively high temperatures; and this advantage is one contributing to certain others mentioned above, notably the ability to produce products with light or pastel shades of coloring, without encountering discoloration. Discoloration, of course, would be particularly detrimental in the case of light colored products, or products having at least some light colored areas in the pattern.

How the foregoing objects and advantages are attained, together with others which will occur to those skilled in the art will appear more fully from the following description referring to the accompanying drawings in which:

FIGURE 1 is a plan view of one form of product which may be produced in accordance with the present invention, the product here shown being particularly suitable as a floor covering;

FIGURE 2 is a greatly enlarged fragmentary sectional view taken as indicated by the line 2—2 on FIGURE 1;

FIGURES 3, 4 and 5 are fragmentary sectional views illustrating certain stages in the production of the product of FIGURES 1 and 2, these stages representing a sequence of steps preceding the completed stage which is shown in FIGURE 2;

FIGURE 6 is a schematic illustration or diagrammatic representation of a system and suitable equipment for carrying out the technique of the present invention; and FIGURE 7 is a view similar to FIGURE 6 but illustrating certain modifications in equipment and processing steps which may be employed.

Attention is first directed to FIGURES 1 and 2. As seen in FIGURE 1 the product here shown is one simulating tile. The tiles themselves are simulated by lands 8 separated by a network of valleys 9 simulating mortar joints between the tiles. As better seen in FIGURE 2 the lands 8 are largely made up of foamed resin material of appreciable thickness as compared with the valleys 9. It will also be noted from FIGURE 2 that the product is built up upon a flexible base sheet indicated at 10 in FIGURE 2 and which, in a typical case, may comprise a layer of felt, either an organic felt or an asbestos felt.

With regard to FIGURES 1 and 2 it should be kept in mind that the tile pattern is shown only by way of example. The pattern effects may be floral or may simulate gravel or other types of materials or may be purely fanciful.

Before turning to a full description of the details of the method and of the specific makeup of the product produced thereby, there is here presented a brief and generalized description of a typical operation, particularly pointing out the unique system employed in accordance with the present invention in producing foamed and relief effects, i.e., a product effect incorporating lands of substantial thickness and porosity and valleys of lesser thickness and greater solidity.

In such a typical operation, for instance for producing a floor covering, a flexible sheet such as a layer of felt is provided with a layer of liquid foamable material comprising a mixture of dispersion grade polyvinyl chloride resin, and containing (in addition to desired plasticizers, pigments or the like) two other ingredients, one of which is a foaming or blowing agent, azodicarbonamide preferably being used for that purpose according to the present invention, although certain others may also be employed as will further appear. The other of the two additional ingredients comprises a zinc-organic compound, for example zinc naphthenate. In a foamable composition of the type just referred to, the zinc containing organic compound serves as a catalyzer for the decomposition of the foaming agent, thereby reducing the temperature of decomposition. In consequence of the presence of the zinc-organic compound, decomposition of the foaming agent may be effected at a lower temperature than in the absence of the zinc-organic compound. In fact, decomposition of the foaming agent may be effected at comparatively moderate temperatures within the range in which the resin material may readily be fused.

For example in the case of use of azodicarbonamide as foaming agent, the decomposition temperature may be lowered by as much as 50° F. as a result of the presence of the catalyst. Therefore decomposition of the azodicarbonamide will then take place within the optimum temperature range for fusion of the foamable composition, i.e., in a range above the temperatures at which the fused material will lack toughness, with consequent cracking of foam cell walls, but below the temperature where the viscosity of the resin material is so low that the foam cells become irregular and interconnected because of cell wall collapse.

The zinc-organic compound also serves as a stabilizer for the resin, i.e., a stabilizer for diminishing the effects of light and heat on the resin material.

Following the application of the liquid layer of the foamable composition, the foamable layer is preferably heated sufficiently to gel the foamable layer to the point where it has sufficient film strength to be flexed without cracking, although not fused to its ultimate strength, but this heating operation is carried out at a temperature insufficient to decompose the foaming agent notwithstanding the presence of the zinc containing catalyst.

Following the gelling of the foamable coat, the material, in a typical case, is next subjected to a printing operation, the printing composition (either with or without pigment or other suitable coloring matter) contains an ingredient having a unique relationship to the composition of the foamable layer, namely an agent acting to suppress the catalyzing action of the zinc containing compound on the foaming agent. In consequence, in the areas to which the catalyst suppressing agent is applied the catalyzing influence of the zinc compound is diminished or elimianted, so that a higher temperature is needed to effect decomposition of the foaming agent. In fact, the decomposition temperature of the foaming agent in those areas is above that employed for fusing the resin material, thereby resulting in little if any foaming in the printed areas while the other areas expand and become porous. This is an unexpected effect, especially when considering the fact that in the absence of the zinc containing catalyst, printing with a composition containing that same catalyst suppressing agent results (upon the subsequent heating) in accentuation of the foaming action of the azodicarbonamide or other foaming agent.

As the catalyst suppressing agent it is preferred to use benzotriazole or aminotriazole, which I have found to possess the unique catalyst suppressing characteristic referred to. As the catalyst suppressing agent, 8-hydroxy quinoline may also be used, although this compound tends to introduce a pink tone to the product. Such coloring is not preferred for most purposes but is not objectionable for some purposes. Still another suppressant which may be employed is N-phenyl glycine.

In the typical case under consideration, subsequent to the printing but before the heating to fuse the resin materials, the foamable layer and the printing is completely covered with a coating of transparent polyvinyl chloride resin material which may ultimately serve as a wear layer for the product. Whether or not such a wear layer is applied, the material is heated to a temperature sufficient to fuse the resin materials present and at the same time to decompose the foaming agent, the decomposition effect being very pronounced in the non-suppressed areas, i.e., in the areas where the catalyzing action of the zinc containing compound is not depressed by the agent referred to. The resultant product is one in which a relief effect is developed following the pattern of printing, the unprinted areas representing lands and the printed areas valleys, for instance lands and valleys as illustrated by way of example in FIGURES 1 and 2.

It is here pointed out that in FIGURES 1 and 2, and also in FIGURES 3, 4 and 5, no attempt is made to accurately depict actual or relative dimensions or thicknesses of layers, these figures merely being presented as an aid to the explanation given in this description. For example, the flexible base or felt layer shown at 10 in a typical product would comprise a felt sheet of about 0.04 inch thickness.

Before considering certain specific examples of formulations and operations, attention is now directed to the schematic illustration of the techniques and equipment suitable for carrying out the operation as presented in FIGURES 6 and 7.

Considering first FIGURE 6, a supply roll of suitable felt is indicated at 11. The felt web W is delivered from this supply roll to a coating equipment incorporating a reservoir 12 containing a coating composition and having a pickup roll 13, and another roll 14 around which the web passes in contact with the pickup roll 13. As coating equipment of this type is well known, the details thereof need not be considered herein, but it is here noted that this is employed to apply to the web what might be termed a prime coat. One or more such coats may be used, or the prime coating may even be entirely omitted, depending for instance upon the character of the flexible base being employed. Upon delivery from the roll 14, the web passes one or more heaters, such as indicated at 15 which may be either of the radiant heat or hot air type and which provide for substantial drying of the coating applied.

After passage through an accumulator of known type the web is then passed through another coating equipment in this instance of the well-known reverse roll coater type, incorporating a rubber surfaced backup roll 16, a casting roll 17 and a metering roll 18, the latter rolls being provided with blades or the like as indicated at 19 as an aid to establishment of a reservoir of coating material as indicated at 20 from which the coating composition is delivered by roll 17 to the web. As is indicated in the figure, this equipment is employed in the embodiment of FIGURE 6 to apply the foamable coat to the web, after which the web passes through a suitable heating means such as the oven indicated at 21 for effecting gelling of the foamable coat. As above noted, however, the heating is here not sufficient to decompose the foaming agent, but only sufficient to solidify the coating and thereby permit subsequent printing or application of catalyst suppressant.

As shown in the embodiment of FIGURE 6, after leaving the oven 21, the web passes through two printing stages, for instance printing stages of the gravure type, the first of which incorporates a reservoir 22 for a printing composition. A printing roll 23 having an etched or otherwise configured surface picks up the printing composition from the reservoir 22, the excess being wiped off by a doctor blade 24 and the remainder transferred to the web against the backup roll 25. A heater 26 serves to at least partially dry the printing composition applied in this stage of printing before engagement of the printed surface with other equipment.

A similar arrangement of parts is included in the second printing stage, as indicated by the numerals 22a, 23a, 24a, 25a and 26a. The nature of the compositions printed in these two printing stages is referred to more fully hereinafter, but it is here noted that at least one of them is used to apply a printing composition incorporating the agent for suppressing the action of the catalyst on the decomposition of the foaming agent.

After leaving the second printing stage the web again enters a reverse roll coater incorporating a backup roll 27, casting roll 28 and metering roll 29, together with suitable blades or guides 30 for establishing a reservoir of coating composition as indicated at 31. Here a top coat is applied to the printed product, preferably a transparent resin wear layer as already briefly mentioned above.

The web carrying the various coatings and printing is then fed through an oven 32 in which sufficient heat is applied to decompose the foaming agent and to fuse or harden the various resin materials applied to the product, thereby developing the full physical properties of the resin materials and preparing the product for use. The product may be wound up upon a takeup reel indicated at 33 after suitable cooling and after passing through an accumulator of known type.

Suitable cooling may also be introduced between certain of the preceding operations, for instance between the oven 21 and the printing.

With regard to the system of FIGURE 6 it should first be noted that not all stages of the operation need necessarily be carried on continuously in the manner diagrammed in FIGURE 6. For example the product could be wound up and stored for an interval subsequent to the treatment in oven 21 or subsequent to the printing. It is also true with reference to the embodiment of FIGURE 7 that not all stages of the operation need necessarily be carried on continuously and simultaneously as is there diagrammed.

A system such as shown in FIGURE 6 may be employed in producing a product such as shown in FIGURES 1 and 2. In this case, it may be assumed that the layer indicated at 34 in FIGURES 3, 4, 5 and 2 represents the prime coat applied at the beginning of the production line of FIGURE 6. Here again it should be kept in mind that FIGURES 2 to 5 are not intended to accurately depict thicknesses of coatings. In the case of a felt web the prime coat may, as a fatter of fact, be largely absorbed into the surface portion of the felt.

The layer indicated at 35 in FIGURES 4 and 5 represents the foamable coat which may be applied by the reverse roll coater 16 to 20 of FIGURE 6. Such a foamable coating, according to the invention will contain the foaming agent itself and also the catalyzing material for the foaming agent such as the zinc containing compound above referred to.

The printed material indicated at 36 in FIGURES 4, 5 and 2, represents the printing corresponding to the valleys or mortar joints 9 of the pattern shown in plan in FIGURE 1, and this printing may be applied by an appropriately etched printing roll 23 of the printing stage 23 to 26. It is this printing composition which contains the agent for depressing the catalyzing action of the catalyst on the foaming agent in the foamable composition.

The printing indicated at 37 in FIGURES 4, 5 and 2 may be applied by the second printing stage 22a to 26a and this may comprise any desired color printing registered with the first printing in order to provide the desired color effect upon the lands 8 of the pattern of FIGURE 1, i.e., the lands representing titles. The composition employed for this stage of the printing would not contain the catalyst depressing agent, so that the catalytic action of the catalyst such as the zinc compound mentioned would not be depressed in those areas of the pattern.

The top coating indicated at 38 in FIGURES 5 and 2 represents the transparent wear layer or coating such as applied by the reverse roll coater 27–31 of FIGURE 6.

After passage through the oven 32 to effect decomposition of the foaming agent in the pattern areas representing the tiles of FIGURE 1 and to effect fusion and hardening of the resin materials, the cross section of the product takes on the appearance generally suggested in FIGURE 2 in which a pronounced relief effect is established between the areas covered by the printing 36 and the remainder of the surface of the product.

It should be understood in connection with the system of FIGURE 6 that variations may be adopted in accordance with desired effects. For example it may be desired to employ only one printing stage, even in producing a product of the general kind shown in FIGURE 1, and in this event the foamable layer 35 applied by the reverse roll coater 16 to 20 may be made up of a composition containing a pigment appropriate to the desired coloring of the lands of the ultimate product. In such case the printing 36 may be of contrasting color and may be applied in a single printing stage.

It should also be kept in mind that the printing composition need not always contain a pigment, although for most types of product patterns it is preferred to employ pigmented printing compositions containing a suppressant for the catalyst. Where no pigment or other coloring material is included in the printing composition a product may be obtained in which both lands and valleys are provided but have the same color, and in this case the pattern or texture effect of the product is contributed merely by virtue of the relief or embossed type of appearance provided.

Still further in a system such as illustrated in FIGURE 6, still another kind of pattern effect is obtainable. This would be achieved by employing two printing stages in one of which the printing composition was transparent but contained a catalyst suppressant and in the other of which the printing composition contained no catalyst suppressant but contained a pigment. In this way products may be obtained having both lands and valleys, at least a portion of the lands being printed to contrast in color with the valleys or with other portions of the lands or with both.

It is further to be understood that the printing may be effected in a variety of patterns. For instance instead of a simple block or tile pattern such as illustrated in FIGURE 1, an intricate pattern may be printed, such as a pattern simulating gravel or stones or even floral effects. In such cases the portions of the printing in which the printing composition contains a catalyst suppressant and thus the valleys of the pattern, may lie between lands representing stones or flowers of the pattern.

In connection with the application of the catalyst suppressing agent, while FIGURE 6, and also FIGURE 7 described herebelow, illustrates the use of printing rolls for applying this agent, it should be kept in mind that in the broader aspects of the invention, the particular manner of application of the suppressant is not critical. Broadly speaking all that is required is the employment of some technique or equipment for applying this suppressant in pattern areas, so as to develop the desired relief effect, according to whatever pattern is selected. Moreover with different techniques for applying the suppressant, the type of composition employed may be varied. Indeed the suppressant composition, in the broad aspect of the invention, need comprise nothing but the suppressant itself. For most purposes, however, it will be found more convenient and practical to employ some vehicle in the application of the suppressant, for instance a vehicle having a resin base as referred to elsewhere in this application, and for most purposes it will also be found convenient and practical to employ some form of printing operation and equipment for applying the suppressant.

Attention is now directed to the system of FIGURE 7. Certain portions of the system of FIGURE 7 are the same as or similar to portions in FIGURE 6 and will be referred to only briefly. In FIGURE 7 a supply roll 39 for a web W is shown as delivering the web into a prime coater of the same type as shown in FIGURE 6. From the prime coater the web passes through an accumulator and then to a roll arrangement for applying a smoothing coat to the web. This may be desirable, especially when employing as a base sheet certain types of felt which are relatively rough. The smoothing coat is developed from a reservoir 40 of a coating composition of a type to be explained, this composition being picked up by a roll 41 with which the rubber surfaced backup roll 42 cooperates the web passing into the nip between these two rolls and thence around the backup roll 42 and into the nip between the roll 42 and the heated smooth roll 43. It will be noted that the direction of rotation of these rolls is different from that employed in a reverse roll coater and conforms with that disclosed in the copending application of Edward R. Erb, Ser. No. 270,591, filed Apr. 4, 1963, assigned to the assignee of the present application which copending application was abandoned and of which a continuation application Ser. No. 633,647 was filed Mar. 8, 1967. In this roll setup the roll 41 preferably has an engraved surface to pick up the coating material from the reservoir 40, and after cooperating with the doctor blade indicated at 44 the roll 41 transfers the coating material to the web in the nip between the applicator roll 41 and the rubber covered backup roll 42. The engraving or other markings provided on the roll 41 to pick up the coating composition are preferably uniformly distributed over the surface of the roll and also provide a pickup volume adequate to deliver to the web sufficient composition to develop a bead or reservoir of coating material in the nip between rolls 42 and 43, as is indicated at 45. By maintenance of this reservoir 45 in this way, a uniform and smooth coating is applied to the web by an action somewhat equivalent to "casting," whereby irregularities in the surface of the flexible sheet being employed as a base may be eliminated prior to the application of the foamable material. The roll 43 desirably comprises a metal roll, preferably chromium plated and internally heated sufficiently to gel the coating material here applied.

From the above smoothing coater, the web passes to another similar coating equipment comprising parts 40a to 45a which operates in the same general manner but is here employed to apply the foamable coat to the web on top of the smoothing coat. In this case the temperature of roll 43a should be regulated to gel the resin material but not to decompose the foaming agent.

Thereafter the web is delivered to a printing stage including a reservoir 46 for a printing composition and an engraved printing roll 47, doctor blade 48 and rubber covered backup roll 49, this printing stage being provided in order to print in selected pattern areas the composition containing the suppressant for the catalyzer for the foaming agent which has previously been applied in the foamable coating or layer. After leaving the printing stage heating may be applied to eliminate tackiness as indicated at 50. The material then is delivered through a reverse roll coater 27a, 28a, 29a, 30a and 31a of the kind described above in connection with FIGURE 6 for applying a transparent top coating. The coated web then passes through an oven 32a corresponding to oven 32 of FIGURE 6 and finally through an accumulator to be wound up on a takeup reel 51.

It will be understood that it may be necessary or desirable to cool the web before entering the final accumulator and being rolled up, and also between certain other coating or printing operations, for instance between the smoothing coating and the foamable coating, and also between the foamable coating and the printing.

Certain points of distinction between the systems of FIGURES 6 and 7 will readily be apparent but it is particularly pointed out that the type of coating equipment shown for applying the foamable coat in FIGURE 7 is very effective for relatively thin coatings, for instance coatings of from 3 to 10 mils thickness before foaming. For thicker foamable coatings, which are desirable for certain purposes, for instance coatings up to about 25 mils thickness prior to foaming, the reverse roll coater such as shown at 16 to 20 of FIGURE 6 is preferred.

In the system of FIGURE 7 it is contemplated that the smoothing coat applied by the roll equipment 40 to 45 should comprise a polyvinyl chloride resin material but without employment of azodicarbonamide or other foaming agent.

With the foregoing description of the product and production systems in mind, attention is now directed to certain matters of formulation and certain specific examples which may be used according to the present invention. Unless otherwise indicated all parts are given as parts by weight.

BASE

First, any flexible base sheet may be used, for floor coverings, preferably a felt, and most advantageously an impregnated asbestos felt or a resin impregnated cellulose or other organic felt, or, with suitable sealing coats, an asphalt saturated organic felt. A paper sheet, cloth or metal foil may be used for some puroses, such as wall coverings or upholstery.

PRIME COAT

The application of a sealing or prime coat is not always essential but if used, a prime coating material may be made up of a latex, for example one containing an acrylic polymer, with or without pigments or fillers, such as the following:

Example A

For each 100 parts of the acrylic polymer (in this case an acrylic emulsion copolymer consisting of 35–40% ethyl acrylate and 60–65% methyl methacrylate)

| | Parts |
|---|---|
| Clay | 80 |
| Water | 80 |

A formulation of the kind just above provides good bonding with the fibers of the base sheet, permits smoothing by a hot roll to iron down protruding fibers, and further presents a surface to which the vinyl type of compositions subsequently applied have good adherence. The specific composition of the prime coat is not per se a part of the present invention and therefore variations thereof need not be considered herein.

RESIN MATERIALS

For at least most of the other coatings and materials applied, including the smoothing coat, if used (for instance in accordance with the system of FIGURE 7), the foamable coat, the transparent top coat, and in some cases the suppressant composition, it is preferred to employ polyvinyl chloride resin materials, especially as plastisols or organosols. Various of these materials are commonly referred to (by their use) as paste or dispersion type polyvinyl chloride resins.

Resins usable for many purposes herein may vary over some appreciable molecular weight range, it being preferred to employ a resin of lower molecular weight for the foamable coat and a resin of higher molecular weight for other coatings such as the smoothing coat and the top wear layer, For example, for certain of the compositions employed, particularly for the foamable coating, a polyvinyl chloride resin of molecular weight resulting in a relative viscosity of 2.05, measured as indicated below, is suitable.

For certain other compositions, for instance the top coating, a polyvinyl chloride resin having a relative viscosity of about 2.65 is suitable.

The relative viscosity values here mentioned were taken in accordance with the following procedure:

A 1% solution of the resin is made up in cyclohexanone and is passed through an Ostwald Viscometer (1 millimeter capillary), and the time of flow is compared with that for pure cyclohexanone. This comparison is run in a water bath at 25° C. The relative viscosity, i.e., the viscosity figures given above, is the ratio of the flow time of the 1% solution to the flow time of pure cyclohexanone, as measured at 25° C.

For printing inks more soluble vinyl resins than the paste or dispersion type resins are preferred. These resins preferably contain small amounts of copolymerization constituents such as vinyl acetate. These may be referred to as solution type resins.

SMOOTHING COAT

For a smoothing coat, if used, a formulation as follows is suitable:

Example B

For each 100 parts (by weight) of a high molecular weight homoploymer dispersion PVC resin of 2.65 relative viscosity:

| | |
|---|---|
| Butylbenzyl phthalate | 50.00 |
| High boiling mineral spirits | 0.60 |
| Epoxidized soya oil | 5.00 |
| Barium cadmium stabilizer | 5.00 |
| Viscosity reducing surfactant | 0.50 |
| Titanium dioxide | 30.00 |

Here again possible variations need not be considered because the specific composition of the smoothing coat is not per se a part of the present invention.

FOAMABLE COAT

For the foamable coat it is preferred to employ paste or dispersion type of polyvinyl chloride resin and to provide a liquid composition thereof suitable for application by a reverse roll coater as shown in FIGURE 6 or by the type of coating equipment shown in FIGURE 7 for that purpose. An example of such a composition is as follows:

Example C

For each 100 parts of a relatively low molecular weight homopolymer dispersion PVC resin of 2.05 relative viscosity:

| | |
|---|---|
| (a) Butylbenzyl phthalate (plasticizer) | 56.00 |
| (b) Mineral spirits | 4.15 |
| (c) Epoxidized soya oil | 6.40 |
| (d) Titanium dioxide (pigment) | 7.40 |
| (e) Azodicarbonamide | 2.50 |
| (f) Zinc octoate (8% zinc) | 2.225 |

Ingredients (c), (d) and (e) are preferably preliminarily ground as a paste, which is thereafter added to a batch of the other ingredients, including the resin itself, which have previously been intermixed.

The foregoing formulation has been used, together with a printing composition idenitified herebelow, but before proceeding with a description of the printing composition, certain usable variations in the ingredients and the quantities thereof in the foamable coating are first noted.

Various plasticizers may be used either with or in substitution for the butylbenzyl phthalate referred to above, for instance dioctyl phthalate.

The pigment (Item (d)) may either be omitted or replaced by other pigments or coloring materials, for instance carbon black, although for most purposes a light shade or white background is preferred for pattern effects, as is provided by the titanium dioxide included in the above example.

In a typical formulation such as above given, various of the ingredients may be varied in quantity employed. For example Item (a)—the plasticizer—may be varied from about 30 parts to about 80 parts per 100 parts of resin. Many different plasticizers may be used, as is well known in formulation of resins of the kinds here employed. Mineral spirits (Item(b)) need not necessarily be included but can be present up to 10 or 15 parts, depending upon the viscosity required for the particular coating operation used. A stabilizer such as the epoxidized soya oil may be present in amounts ranging from 2 to 8 or 9 parts per 100 parts of resin. This ingredient aids in stabilizing the resin against discoloration due to heating.

While, as above indicated, azodicarbonamide is the preferred foaming agent, nevertheless other foaming agents may be used, for instance N,N'-dinitroso pentamethylene tetramine and p-toluene sulfonyl semicarbazide. The foaming agents above referred to above decomposition temperatures as indicated just below:

| | ° F. |
|---|---|
| Azodicarbonamide | 380–395 |
| N,N'-dinitroso pentamethylene tetramine | 355–375 |
| p-Toluene sulfonyl semicarbazide | 415–430 |

From the above it will be seen that foaming agents having decomposition temperatures within a range extending from about 350° F. to about 430° or 440° F. are usable. Agents having such decomposition temperatures, when appropriately catalyzed with the zinc-organic compounds will decompose at lower temperatures, within the range in which it is practical to effect fusion of the resin materials.

The amount of foaming agent employed may vary from about ½ part to about 20 parts by weight per 100 parts of the resin. The quantity needed will vary somewhat in accordance with the particular foaming agent being used. When using azodicarbonamide, as is preferred, the amount may run from about ½ part to about 4 or 5 parts by weight per 100 parts of the resin, but not much increase in porosity is developed beyond about 3.5 parts.

In connection with Item (f), as was pointed out above, this ingredient performs two functions in the system. First, it acts as a catalyst with reference to decomposition of the azodicarbonamide or other foaming agent, thereby enabling production of the foam at a lower tempeature than in the absence of this ingredient (Item (f)). Seconds, it acts as a stabilizer diminishing the effects of heat and light on the polyvinyl chloride resin materials.

A number of zinc containing organic compounds may be used. These usable compounds are in general salts of organic acids, especially of fatty acids, such as zinc stearate, zinc palmitate, zinc laurate, or salts of other organic acids such as zinc resinates, and especially zinc naphthenate and zinc octoate, the latter two being the preferred catalysts. They may be used either by themselves or intermixed.

The amount of the zinc containing catalyst may run from about 1 part to 4 or 5 parts by weight for each 100 parts of resin, but the catalyzing action does not increase noticeably beyond about 3 parts.

It is also to be noted that the foamable composition is preferably also formulated to exclude certain constituents such as certain resin stabilizers. For instance the presence of organic compounds of barium or of calcium tend to inhibit the catalytic action of the zinc compound on the decomposition of the foaming agent.

The heating provided after application of the foamable coat is desirably sufficient to gel the resin material but insufficient to decompose the foaming agent. A temperature between 250° F. for 2–4 minutes and 350° F. for shorter periods is suitable for this purpose. At the higher temperatures, exposure to the heat must be limited to only a short time.

SUPPRESSANT COMPOSITION

The suppressant composition may be varied quite widely, depending upon a number of factors, especially the technique employed for applying the composition. For printing operations, which represent a preferred technique for this purpose, the printing compositions may in general be of two different types, i.e., either solutions or dispersions. A suitable dispersion type printing composition may be made up with paste grade of polyvinyl chloride resin as a base, for example as follows:

Example D

For each 100 parts of a high molecular weight homopolymer dispersion PVC resin of 2.65 relative viscosity:

| | |
|---|---|
| Dioctyl adipate | 96.00 |
| Polyethylene glycol monolaurate | 1.80 |
| Benzotriazole | 25.00 |

The foregoing composition incorporates no coloring matter or pigment, but as above noted this is not necessarily present in the printing composition. A pigment may be added to a composition of the foregoing type if desired.

Wherever reference is made herein to the use of pigments, that term is to be understood in a broad sense, since various coloring materials, even dyes may be employed, the specific nature of the coloring material not being a part of the present invention per se.

It should be kept in mind that the quantity (25 parts) of benzotriazole present in the foregoing composition produces appreciable depressing or suppressing effect on the zinc catalyst for the foaming agent when employed with a foamable composition such as that heretofore referred to, but for most purposes a more pronounced suppressing action is desirable in order to accentuate the relief effect of the product and this is achieved by increasing the quantity of catalyst suppressant present in the printing ink, above that indicated in the above example. On the basis of the weight of the resin present in the printing ink, the quantity of benzotriazole employed may run from about 40 parts by weight up to about 150 parts by weight, but most advantageously will fall in the range from about 70 parts by weight to about 100 parts by weight. Within that range and with ordinary printing techniques, it will be found that effective amounts of the benzotriazole will penetrate the foamable coat in order to act on or depress the catalyst.

As an example of a solution type of ink, the following may be employed, this ink being made up of approximately equal parts of two resin constituents, one constituent comprising a copolymer of vinyl chloride and vinyl acetate containing 10% vinyl acetate, and the other resin constituent comprising a terpolymer containing 86% vinyl chloride, 13% vinyl acetate, and 1% maleic acid.

Example E

For each 100 parts (by weight) of the resin:

| | |
|---|---|
| Dioctyl phthalate | 12.20 |
| Xylol | 192.00 |
| Methyl isobutyl ketone | 65.00 |
| Methyl ethyl ketone | 433.00 |
| Titanium dioxide | 240.00 |
| Benzotriazole | 80.00 |

The solution type of ink dries by evaporation of the solvent constituents present and requires less heat than the dispersion type of ink, but either may be employed with appropriate ink drying following the printing.

The following example illustrates the use of aminotriazole. The same mixture of resin constituents was here employed as in the preceding example.

Example F

For each 100 parts (by weight) of the resin:

| | |
|---|---|
| Methyl ethyl ketone | 280.00 |
| Xylol | 152.00 |
| Methyl isobutyl ketone | 45.00 |
| Aminotriazole | 95.00 |

In connection with Examples E and F just above it is to be noted that the resin employed may be varied, for instance the ratio of the two constituents referred to may be altered, for example from about 3–1 to about 1–3.

Where aminotriazole is employed, the quantity thereof may be varied through the same general range as mentioned above for benzotriazole, the suppressing action of the aminotriazole being of similar character to that secured by the benzotriazole.

It is pointed out that there are certain differences obtainable by employment of different catalyst suppressing agents. Thus while benzotriazole is soluble in the solvents which are employed in formulating the printing compositions, aminotriazole is not soluble in such solvents. Benzotriazole will have a plasticizing influence upon the ink composition, tending to render the ink tacky, especially when used in relatively large amounts. Because the aminotriazole is not soluble in the solvent base of the ink, it is necessary to grind this agent somewhat in the manner of a pigment and it is also possible to load the ink with a somewhat higher quantity of aminotriazole, which is advantageous for some purposes, especially where a very strong depressing influence on the catalyst is desired.

As above noted certain other suppressing agents may also be used such as 8-hydroxy quinoline and N-phenyl glycine, and in the event of use of these agents the quantity thereof may be varied in the same general range as noted above in connection with the use of benzotriazole.

TOP COAT

After printing, a suitable wear coat may be applied, again being formulated with paste or dispersion type polyvinyl chloride resin material as a base, for instance as follows:

Example G

For each 100 parts (by weight) of a high molecular weight homopolymer dispersion PVC resin of 2.65 relative viscosity:

| | |
|---|---|
| Dioctyl phthalate | 22.50 |
| Epoxidized soya oil | 7.00 |
| Polyethylene glycol monolaurate | 0.80 |
| Light stabilizer | 5.00 |
| High boiling mineral spirits | 18.00 |

For most purposes it is preferred to use more dioctyl phthalate or plasticizer than is shown in Example G above, for instance from about 30 parts to about 50 parts. Other variations in the composition of the top coating may of course be resorted to according to known factors but since the specific composition of the top coating is not a part of the present invention per se, such variations need not be considered herein.

The ultimate heating of the product following the top coating is preferably effected in an oven at an air temperature of from 340° F. to 400° F. Somewhat higher temperatures may be employed, even up to about 425° F., depending upon the speed at which the web W is travelling through the oven.

The following examples further illustrate production techniques according to the present invention.

Example 1

An asbestos felt, .04 inch thick and impregnated with approximately 15% of neoprene was first coated with a prime coat comprising 40% solids polyacrylic latex. The prime coat was dried with a hot air blast of 200° F.

Then a foamable coating was applied with a knife coater, the thickness of the coating being about 0.012 inch, the composition of the foamable coating was the same as that given in Example C above except that 2,2,4-trimethyl pentanediol isobutyrate benzoate was substituted for the plasticizer of constituent (a), the amount being the same, and except that the zinc octoate of constituent (f) was employed in the amount of 2.5 parts, instead of 2.225 parts.

The foamable coating was gelled by heating in a circulating air oven, operating at a temperature of 250° F., the heat time being 2.5 minutes.

After the foamable coat was gelled, the material was rotogravure printed in a selected pattern representing the mortar joints between small irregular tile, the printing composition being the same as given above in Example F except that a small amount of orange and black pigments were added to give a tint to the printed areas.

After the printing was dried a clear top coating was applied by knife coating yielding a layer of 0.007 inch, the top coating comprising the following:

For each 100 parts of a high molecular weight homopolymer dispersion PVC resin of 2.65 relative viscosity:

| | |
|---|---|
| 2,2,4-trimethyl pentanediol isobutyrate benzoate | 50.00 |
| Light stabilizer | 5.00 |
| Epoxidized soya oil | 6.00 |
| High boiling mineral spirits | 6.00 |
| Alkyl phenyl ether of polyethylene glycol | 0.60 |

The material was thereafter introduced into an oven for final heating and fusion of the resins and for decomposition of the foaming agent, and, therefore, development of the foam in the unprinted areas of the pattern. For this purpose a circulating hot air oven was used, maintaining elevated temperature on both sides of the product, and the heating was effected at an air temperature of 355° F. for a period of 3.5 minutes.

The product thus produced was characterized by a good quality of foam in which the initial foamable layer applied was expanded in the unprinted areas to approximately 250% of the thickness of the heated printed areas. This presented a marked relief effect with a high degree of resilience in the unprinted areas. The product was of good color and also good color permanence, and was highly resistant to staining, particularly with reference to sulphide influences.

Example 2

Another product was prepared substantially in accordance with the steps in Example 1 above except that in the foamable coating 2.50 parts of zinc naphthenate (10% zinc) were employed in place of the zinc octoate.

The product was similar in characteristic to the product described under Example 1 but the extent of foaming or expansion of the unprinted areas was somewhat greater. The thickness of the unprinted areas in the final product was about 275% of the thickness in the printed areas.

Example 3

This example was also prepared generally in accordance with the Example 1 above except that instead of using zinc octoate alone in the foamable coating the following two ingredients were used:

| | |
|---|---|
| Zinc naphthenate (12% zinc) | 1.5 |
| Zinc octoate (8% zinc) | 1.0 |

In the product produced in this manner the thickness of the expanded foam coating was 350% of the thickness of the printed areas, thereby presenting a more deeply embossed or a more pronounced relief effect.

Example 4

In this example, the base of the product, comprised a cellulosic felt impregnated with polyvinyl acetate and other resin constituents, the felt being about .052 inch thick.

Initially a prime coating was applied comprised of a polyacrylic latex (40% solids) and this was heated in an oven at a temperature of 250° F. for a period of 20 seconds.

A smoothing coat was then applied by a technique disclosed in copending application Ser. No. 270,591, above identified, the composition of the coating conforming with that given above as Example B. The heating effected by the heated chromium plated roll (such as indicated at 43 in FIGURE 7) provided for heating the web for an interval of about 1.5 seconds against the roll surface which was maintained at a temperature of 290° F. This gelled the smoothing coat sufficiently to enable application of the foamable coat.

The amount of composition applied as the smoothing coat provided a thickness averaging .0025 inch and this resulted in presentation of a smooth surface on which the foamable coat was applied.

After the web was cooled, it was passed through equipment for applying the foamable coat, this equipment conforming with that disclosed in said copending application and being arranged in the general manner illustrated in FIGURE 7. In this case the roll 43a was of larger diameter than the roll 43 and, therefore, provided a somewhat longer interval of contact with the heated roll, namely, about two seconds and the temperature of the roll 43a was maintained at about 300° F. This provided adequate heat to gel the foamable coat but not sufficient heat to decompose the azodicarbonamide of the foamable composition.

The composition of the foamable coating was as follows:

For each 100 parts of a relatively low molecular weight homopolymer dispersion PVC resin of 2.05 relative viscosity:

| | |
|---|---|
| 2,2,4-trimethyl pentanediol isobutyrate benzoate | 54.7 |
| Epoxidized soya oil | 6.3 |
| Zinc catalyst | 2.5 |
| High boiling mineral spirits | 6.3 |
| Titanium dioxide | 25.0 |
| Azodicarbonamide | 2.5 |

The amount of foamable composition applied was sufficient to provide a layer of about .005 inch thickness before expanding.

The coated web was printed in a red brick pattern, the mortar joints being colored gray, the mortar joint printing composition being the only printing containing the suppressant for the catalyst in the foamable composition, namely benzotriazole. The printing composition conformed in general with Example E given above except that the coloring was varied to provide the desired gray color in the mortar joints.

A transparent top coating was thereafter applied over the printing by means of a reverse roll coater, the coating being .015 inch in thickness. The top coating composition was as follows:

For each 100 parts of a high molecular weight homopolymer dispersion PVC resin of 2.65 relative viscosity:

| | |
|---|---|
| 2,2,4-trimethyl pentanediol isobutyrate benzoate | 42.00 |
| Light stabilizer | 5.00 |
| Epoxidized soya oil | 6.00 |
| High boiling mineral spirits | 6.3 |
| Alkyl phenyl ether of polyethylene glycol | 0.6 |

The product was cured in a hot air oven maintained at an air temperature of 360° F., the residence time in the oven being about 5 minutes.

The brick areas of the printed pattern expanded or foamed to an extent providing a noticeable relief in contrast with the lower mortar joints. The thickness of the heated and fused foam layer in the foamed areas was about .017 inch, which contrasted with about .007 inch in the mortar areas.

Example 5

In this example the base of the product comprised a cellulosic felt impregnated with polyvinyl acetate and other resin constituents, the felt being about .052 inch thick.

A prime coating was initially applied comprising a polyacrylic latex (40% solids) and this was heated in an oven at a temperature of 250° F. for a period of 20 seconds.

A foamable coating was then applied to a thickness of about .012 inch, the composition of this coating being the same as that given above in Example 4. The product was then heated to gel the foamable coat, the heating being effected at 250° F. for 2½ minutes.

The product was then printed with the composition of Example F given above, a rotogravure printing cylinder being employed for this purpose, the cylinder having printing areas representing mortar joints between small tile.

A top coating was then applied of the composition specified in Example 4 above and to a thickness of .007 inch.

Final drying was effected at 355° F. for about 3½ minutes.

The foregoing produced a product having a marked relief effect, the foam in the unprinted areas being about 200% of the thickness of the printed areas.

Example 6

This example was prepared in general in accordance with the procedure and with materials as outlined above in Example 4, with the following exceptions:

The smoothing coat referred to in Example 4 was omitted.

In the foamable coat, instead of employing 2.5 parts of azodicarbonamide, 12 parts of p-toluene sulfonyl semicarbazide were used.

As in Example 4, the suppressant composition was prepared in conformity with Example E above, but in this instance, instead of pigmenting to a gray color, the suppressant composition was pigmented to give a dark brown color.

Instead of employing a final fusion temperature of 360° F., the product here was heated in an oven maintained at an air temperature of 370° F., with a residence time of 3 minutes.

In all other respects the treatment was the same as in Example 4.

The foam produced was of good quality and the embossed effect of the foamed areas was approximately 225% of the thickness of the areas to which the suppressant was applied.

Example 7

This example was prepared in general in accordance with the procedure and with materials as outlined above in Example 4, with the following exceptions:

The smoothing coat referred to in Example 4 was omitted.

In the foamable coat, instead of employing 2.5 parts of azodicarbonamide, 10 parts of N,N'-dinitroso pentamethylene tetramine were used.

The final heating to fuse the resin materials was effected in a hot air oven maintained at a temperature of 355° F., the residence time being 3¼ minutes.

In all other respects the treatment was the same as in Example 4.

The foam quality was good. In this instance the extent of foaming was not as great as with certain other examples, the expanded areas being about 170% of the thickness of the areas to which the suppressant was applied.

Example 8

This example was prepared in general in accordance with the procedure and with materials as outlined above in Example 4, with the following exceptions:

The smoothing coat referred to in Example 4 was omitted.

The suppressant composition conformed with that referred to above as Example E, except for the employment of 80 parts of N-phenyl glycine, instead of 80 parts of benzotriazole as in Example E, and in this instance the composition was pigmented to yield a light tan color.

Final fusion was effected in a hot air oven maintained at a temperature of 355° F., with a residence time of 3¼ minutes.

In all other respects the treatment conformed with that of Example 4.

Foam quality was good, with a thickness of 180% of the thickness of the areas to which the suppressant was applied.

Example 9

This example was prepared in general in accordance with the procedure and with the materials as outlined above in Example 4, with the following exceptions:

The smoothing coat referred to in Example 4 was omitted.

The suppressant composition conformed with that referred to above as Example E, except for the employment of 80 parts of 8-hydroxy quinoline, instead of 80 parts of benzotriazole as in Example E, and in this instance the composition was pigmented to yield a light tan color.

Final fusion was effected in a hot air oven maintained at a temperature of 355° F., with a residence time of 3¼ minutes.

In all other respects the treatment conformed with that of Example 4.

The foam quality was good as was the embossed effect, the foamed areas being about 200% of the areas to which the suppressant was applied.

I claim:
1. A method for making a decorative sheet type covering product incorporating foamed polyvinyl chloride resin material including applying to a base sheet a layer of liquid foamable material comprising a mixture of polyvinyl chloride resin, plasticizer, a foaming agent having a decomposition temperature between about 350° F. and 440° F., and a catalyst for lowering the decomposition temperature of the foaming agent, the catalyst being present in an amount comprising from 1 to 5 parts per 100 parts by weight of the resin and comprising an organic-zinc compound, heating said layer to a temperature sufficient to gel the mixture but insufficient to decompose the foaming agent, applying a suppressant composition on the gelled layer in spaced pattern areas, the suppressant composition comprising a material selected from the class consisting of benzotriazole and aminotriazole, and heating the foamable layer with said composition thereon to a temperature sufficient to decompose the foaming agent to a greater extent in the pattern areas between those on which the suppressant composition is applied as compared with the areas on which the suppressant is applied, and thereby develop a relief pattern effect.

2. A method for making a decorative sheet type product incorporating foamed polyvinyl chloride resin material including applying to a base sheet a layer of liquid foamable material comprising a mixture of polyvinyl chloride resin, plasticizer, azodicarbonamide and a catalyst for lowering the decomposition temperature of the azodicarbonamide, the catalyst comprising an organic-zinc catalyst in an amount from 1 to 5 parts per 100 parts by weight of the resin and the azodicarbonamide being present in an amount comprising from 0.5 part to 5 parts per 100 parts by weight of the resin, heating said layer to a temperature sufficient to gel the mixture but insufficient to decompose the azodicarbonamide, applying a suppressant composition on the gelled layer in spaced pattern areas, the suppressant composition comprising polyvinyl chloride resin and containing an agent for suppressing the catalytic action of the catalyst, said agent being selected from the group consisting of benzotriazole and aminotriazole and being present in an amount from 20 parts to 150 parts per 100 parts by weight of the resin in the suppressant composition, and thereafter heating the foamable layer with said composition thereon to a temperature sufficient to decompose the azodicarbonamide in the pattern areas between the applied suppressant composition and to fuse the resin materials, and thereby provide a product having a relief pattern effect.

3. A method according to claim 2 in which the suppressant composition contains a pigment to thereby provide a color pattern effect in registry with the relief pattern effect.

4. A method for making a decorative sheet type covering product incorporating foamed polyvinyl chloride resin material including applying to a base sheet a layer of liquid foamable material comprising a mixture of polyvinyl chloride resin, plasticizer, azodicarbonamide and a catalyst for lowering the decomposition temperature of the azodicarbonamide, the catalyst comprising an organic-zinc compound, the catalyst being present in an amount from 1 to 5 parts per 100 parts by weight of the resin and the azodicarbonamide being present in an amount comprising from 0.5 to 5 parts per 100 parts by weight of the resin, heating said layer to a temperature sufficient to gel the mixture but insufficient to decompose the azodicarbonamide, applying a composition to the gelled layer in spaced pattern areas, the applied composition comprising polyvinyl chloride resin and benzotriazole in an amount from 40 parts to 150 parts per 100 parts by weight of the resin in said applied composition, and thereafter heating the foamable layer with the applied composition thereon to a temperature sufficient to decompose the azodicarbonamide in the pattern areas between those to which the benzotriazole composition was applied and to fuse the resin materials of the foamable layer, but below the temperature required to decompose the azodicarbonamide to the same extent in the areas where the suppressant is applied, and thereby develop a relief pattern effect.

References Cited
UNITED STATES PATENTS

| | | | |
|---|---|---|---|
| 2,739,093 | 3/1956 | Bull | 156—79 |
| 3,293,094 | 12/1966 | Nairn et al. | 156—79 |
| 3,293,108 | 12/1966 | Nairn et al. | 161—160 |
| 2,918,702 | 12/1959 | Wetterau | 18—57 |
| 2,920,977 | 1/1960 | Adams | 117—11 X |
| 2,943,949 | 7/1960 | Petry | 117—11 |
| 2,989,414 | 6/1961 | Pecker | 117—76 X |
| 3,196,062 | 7/1965 | Kristal | 156—79 |

MURRAY KATZ, Primary Examiner

M. R. P. PERRONE, Jr., Assistant Examiner

U.S. Cl. X.R.

117—45, 75, 76; 156—78, 79; 161—159, 160, 161